US012689980B2

(12) United States Patent
Cheng

(10) Patent No.: US 12,689,980 B2
(45) Date of Patent: Jul. 21, 2026

(54) COMMUNICATION DEVICE AND METHOD OF HANDLING A SLEEPING MODE

(71) Applicant: Realtek Semiconductor Corp., HsinChu (TW)

(72) Inventor: Chin Cheng, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 18/582,673

(22) Filed: Feb. 21, 2024

(65) Prior Publication Data

US 2024/0298257 A1     Sep. 5, 2024

(30) Foreign Application Priority Data

Mar. 2, 2023     (TW) ................................. 112107462

(51) Int. Cl.
*H04W 52/02*          (2009.01)

(52) U.S. Cl.
CPC ............................... *H04W 52/0212* (2013.01)

(58) Field of Classification Search
CPC ......... H04W 52/0241; H04W 52/0212; H04W 52/02; H04W 60/00; Y02D 30/70; G06F 1/3246; G06F 1/324; G06F 1/3231; G06F 1/3278; G06F 3/0484
See application file for complete search history.

(56) References Cited

U.S. PATENT DOCUMENTS

| | | | | |
|---|---|---|---|---|
| 7,660,578 B2 * | 2/2010 | Viitamaki | ......... | H04M 1/72412 |
| | | | | 455/426.2 |
| 9,369,539 B2 * | 6/2016 | Luna | ....................... | H04W 4/18 |

| | | | | |
|---|---|---|---|---|
| 9,615,371 B1 * | 4/2017 | de Barros Chapiewski | ................ | |
| | | | | H04W 52/0254 |
| 10,514,746 B2 * | 12/2019 | Chuang | ............. | H04W 52/0258 |
| 11,019,529 B2 * | 5/2021 | Luna | ................... | H04L 67/5683 |
| 2002/0106997 A1 * | 8/2002 | Barber | .............. | H04W 52/0241 |
| | | | | 455/343.1 |
| 2011/0110282 A1 * | 5/2011 | Wu | ..................... | H04W 52/0235 |
| | | | | 370/311 |
| 2015/0111608 A1 * | 4/2015 | Kazmi | ................ | H04W 52/367 |
| | | | | 455/522 |
| 2015/0131462 A1 * | 5/2015 | Puranik | ............. | H04W 52/0216 |
| | | | | 370/312 |
| 2017/0013561 A1 * | 1/2017 | Soldati | .............. | H04W 52/0216 |
| 2018/0206188 A1 * | 7/2018 | Nam | ................. | H04W 52/0229 |
| 2021/0349619 A1 | 11/2021 | Crowley | | |
| 2021/0400545 A1 * | 12/2021 | Akl | ................... | H04W 36/0088 |
| 2022/0167251 A1 * | 5/2022 | Ananda | ............. | H04W 72/0453 |
| 2024/0259942 A1 * | 8/2024 | Koskinen | .......... | H04W 52/0216 |

(Continued)

OTHER PUBLICATIONS

3GPP TS 23.682 V15.9.0, Oct. 2019.

*Primary Examiner* — Un C Cho

(74) *Attorney, Agent, or Firm* — Winston Hsu

(57)          ABSTRACT

A communication device includes a transceiver circuit for communicating with a network to perform a registration; and a processing circuit, coupled to the transceiver circuit, for performing a sleeping mode according to a first configuration from the network; receiving a first instruction from a user, wherein the first instruction configures the communication device to enter a high performance mode from the sleeping mode; ignoring the first configuration and entering the high performance mode from the sleeping mode according to the first instruction.

8 Claims, 3 Drawing Sheets

(56) References Cited

U.S. PATENT DOCUMENTS

| | | | |
|---|---|---|---|
| 2024/0276380 A1* | 8/2024 | Leng | H04W 52/0229 |
| 2024/0334335 A1* | 10/2024 | Zhou | H04W 72/0446 |
| 2024/0389027 A1* | 11/2024 | Abbas | H04L 63/123 |
| 2024/0397422 A1* | 11/2024 | Martin | H04W 52/0235 |
| 2024/0406861 A1* | 12/2024 | Wu | H04L 41/16 |
| 2025/0274864 A1* | 8/2025 | Beale | H04W 52/0235 |

* cited by examiner

COMMUNICATION DEVICE AND METHOD OF HANDLING A SLEEPING MODE

BACKGROUND OF THE INVENTION

1. Field of the Invention

The present invention relates to a communication device and a method used in a wireless communication system, and more particularly, to a communication device and a method of handling a sleeping mode.

2. Description of the Prior Art

In a wireless communication system, after registering with the network, a communication device obtains a configuration associated with a sleeping mode from a network. The communication device performs the sleeping mode according to a setting in the configuration. It takes some time for the communication device to reconnect/synchronize with the network, once the communication device leaves the sleeping mode. In addition, if the communication device intends to change the setting in the configuration, the communication device performs an additional communication (e.g., exchanges messages) with the network. This additional communication occupies resources of the communication device and the network.

SUMMARY OF THE INVENTION

The present invention therefore provides a communication device and a method to solve the abovementioned problem.

A communication device comprises a transceiver circuit for communicating with a network to perform a registration; and a processing circuit, coupled to the transceiver circuit, for performing a sleeping mode according to a first configuration from the network; receiving a first instruction from a user, wherein the first instruction configures the communication device to enter a high performance mode from the sleeping mode; and ignoring the first configuration and entering the high performance mode from the sleeping mode according to the first instruction.

A method for handling a sleeping mode of a communication device, comprises: communicating with a network to perform a registration; performing a sleeping mode according to a first configuration from the network; receiving a first instruction from a user, wherein the first instruction configures the communication device to enter a high performance mode from the sleeping mode; and ignoring the first configuration and entering the high performance mode from the sleeping mode according to the first instruction.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
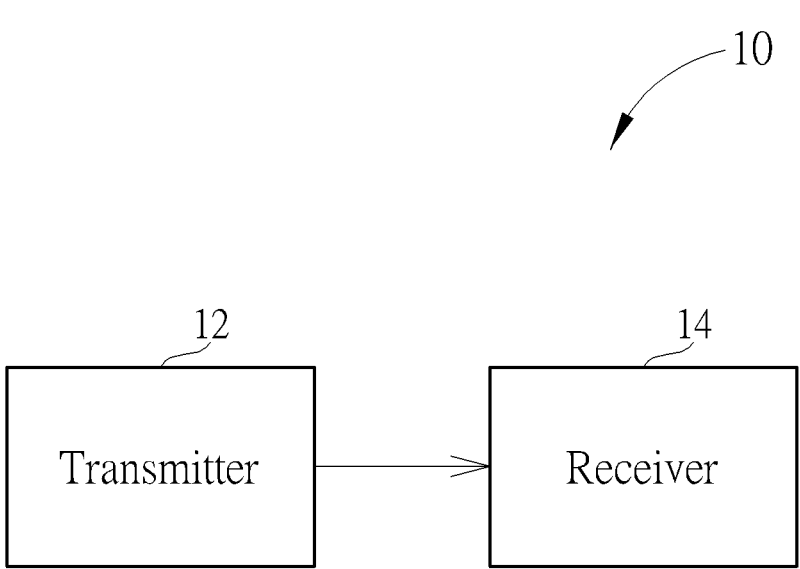
FIG. 1 is a schematic diagram of a communication system according to an example of the present invention.

FIG. 1 is a schematic diagram of a communication system 10 according to an example of the present invention. The communication system 10 may be any communication system using an orthogonal frequency-division multiplexing (OFDM) technique (also termed as a discrete multi-tone modulation (DMT) technique), and is composed of a transmitter 12 and a receiver 14. The communication system 10 may be any wired communication system such as an asymmetric digital subscriber line (ADSL) system, a power line communication (PLC) system or an Ethernet over coax (EOC), but is not limited herein. The communication system 10 may alternatively be any wireless communication system such as a wireless local area network (WLAN), a Digital Video Broadcasting (DVB) system, a Long Term Evolution (LTE) system, a Long Term Evolution-advanced (LTE-A) system or a fifth generation (5G) system, but is not limited herein. In addition, the transmitter 12 and the receiver 14 may be installed in a mobile phone, a laptop, a base station, etc., but not limited herein.

Figure 2:
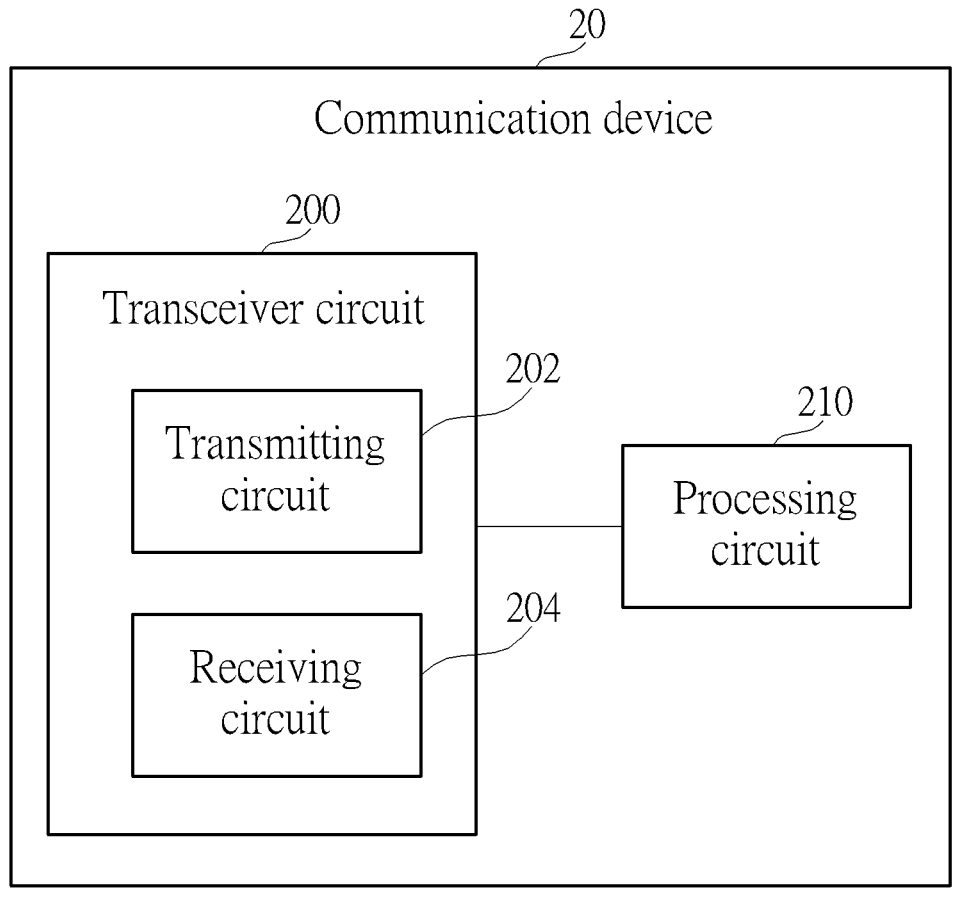
FIG. 2 is a schematic diagram of a communication device according to an example of the present invention.

FIG. 2 is a schematic diagram of a communication device 20 according to an example of the present invention, and may be seen as one of the transmitter 12 and the receiver 14 of FIG. 1. The communication device 20 may be an Internet of Things (IoT) communication device (e.g., a narrowband IoT (NBIoT) communication device), but is not limited herein. The communication device 20 comprises a transceiver circuit 200 and a processing circuit 210, and the transceiver circuit 200 comprises a transmitting circuit 202 and a receiving circuit 204. In detail, the transceiver circuit 200 is configured for communicating with a network to perform a registration. The network may be seen as the other of the transmitter 12 and the receiver 14 of FIG. 1. The processing circuit 210 is coupled to the transceiver circuit 200, and is configured for performing a sleeping mode according to a first configuration from the network. Then, the processing circuit 210 receives a first instruction from a user (e.g., application (AP) user). The first instruction configures the communication device 20 to enter a high performance mode from the sleeping mode. The processing circuit 210 ignores the first configuration and enters the high performance mode from the sleeping mode according to the first instruction. That is, without affecting the network and other communication devices (e.g., the communication device 20 does not perform a random access (RA) procedure with the network), the communication device 20 does not notify the network, ignores the first configuration and enters the high performance mode, when receiving the first instruction. The transmitting circuit 202 is configured for transmitting an attach request message to the network, but is not limited herein. The attach request message comprises a second configuration for the sleeping mode that the communication device 20 desires. The receiving circuit 204 is configured for receiving an attach accept message for responding to the attach request message from the network, but is not limited herein. The attach accept message comprises the first configuration for the sleeping mode. That is, the communication device 20 performs the registration with the network by transmitting the attach request message and receiving the attach accept message, in order to determine a configuration for the sleeping mode. In one example, the first configuration is determined (e.g., by the network) according to the second configuration. In one example, the second configuration is the same as the first configuration.

In one example, the sleeping mode comprises at least one of a power saving mode (PSM) and an extended idle mode discontinuous reception (eDRX) mode. The PSM and the eDRX mode may be utilized to reduce the power consumption of the communication device 20.

In one example, the communication device 20 in the PSM remains registered with the network, and does not (need to) re-attach or re-establish packet data network (PDN) connections with the network. Thus, the communication device 20 in the PSM is not immediately reachable for mobile terminating services. However, the communication device 20 in the PSM is available for mobile terminating services during the time of the communication device 20 being in a connected mode and an active time period of the communication device 20 after the connected mode. The connected mode is triggered according to a mobile originated event of the communication device 20, e.g., transmissions of data and/or signaling, a tracking area update (TAU)/routing area update (RAU) procedure. That is, the communication device 20 in the PSM stops most timers to reduce the power consumption. Thus, the PSM is suitable for a communication device that accepts (or tolerates) delays in performing the mobile terminating services.

In one example, the communication device 20 negotiates with the network so that the communication device 20 in the eDRX mode only receives a paging from the network in a specific window (e.g., a paging time window). The communication device 20 in the eDRX mode may perform mobile terminated data transmissions and/or network originated procedures according to a delay which is dependent on the DRX cycle value. Thus, the communication device 20 needs to consider a delay tolerance of mobile terminated data transmission. The eDRX mode is suitable for a communication device that accepts (or tolerates) delays in performing the mobile terminated data transmission.

In one example, the processing circuit 210 receives a second instruction from the user. The second instruction configures the communication device 20 to enter the sleeping mode from the high performance mode. Then, the processing circuit 210 reconfigures the first configuration according to the second instruction to enter the sleeping mode from the high performance mode according to the first configuration. That is, without affecting the network and other communication devices, the communication device 20 resumes the first configuration to perform the sleeping mode when receiving the second instruction. In one example, the sleeping mode is associated with at least one communication operation of the TAU/RAU procedure, the mobile terminating service and the paging reception, but is not limited herein. In one example, the processing circuit 210 performs a scan (e.g., a frequency scan) continuously to connect to the network, when the communication device 20 is not in a coverage of the network and the communication device 20 is in the high performance mode (or the communication device 20 is configured to enter the high performance mode by the AP user). That is, the communication device 20 considers a real-time communication (the transmission and/ or the reception), but does not consider its own power consumption. In one example, the processing circuit 210 (only) performs the scan (e.g., the frequency scan) in at least one specific time interval to connect to the network, when the communication device 20 is not in the coverage of the network and the communication device 20 is in the sleeping mode (or the communication device 20 is configured to leave the high performance mode by the AP user). In one example, the at least one specific time interval is stored in a non-volatile random access memory (NVRAM) (not shown in FIG. 2) of the communication device 20. In one example, the AP user comprises a user, a control interface such as a graphical control interface (not shown in FIG. 2) of communication device 20 for interacting with the user, a driver code (not shown in FIG. 2) of communication device 20 and/or a driver code data AP (not shown in FIG. 2) of communication device 20.

Figure 3:
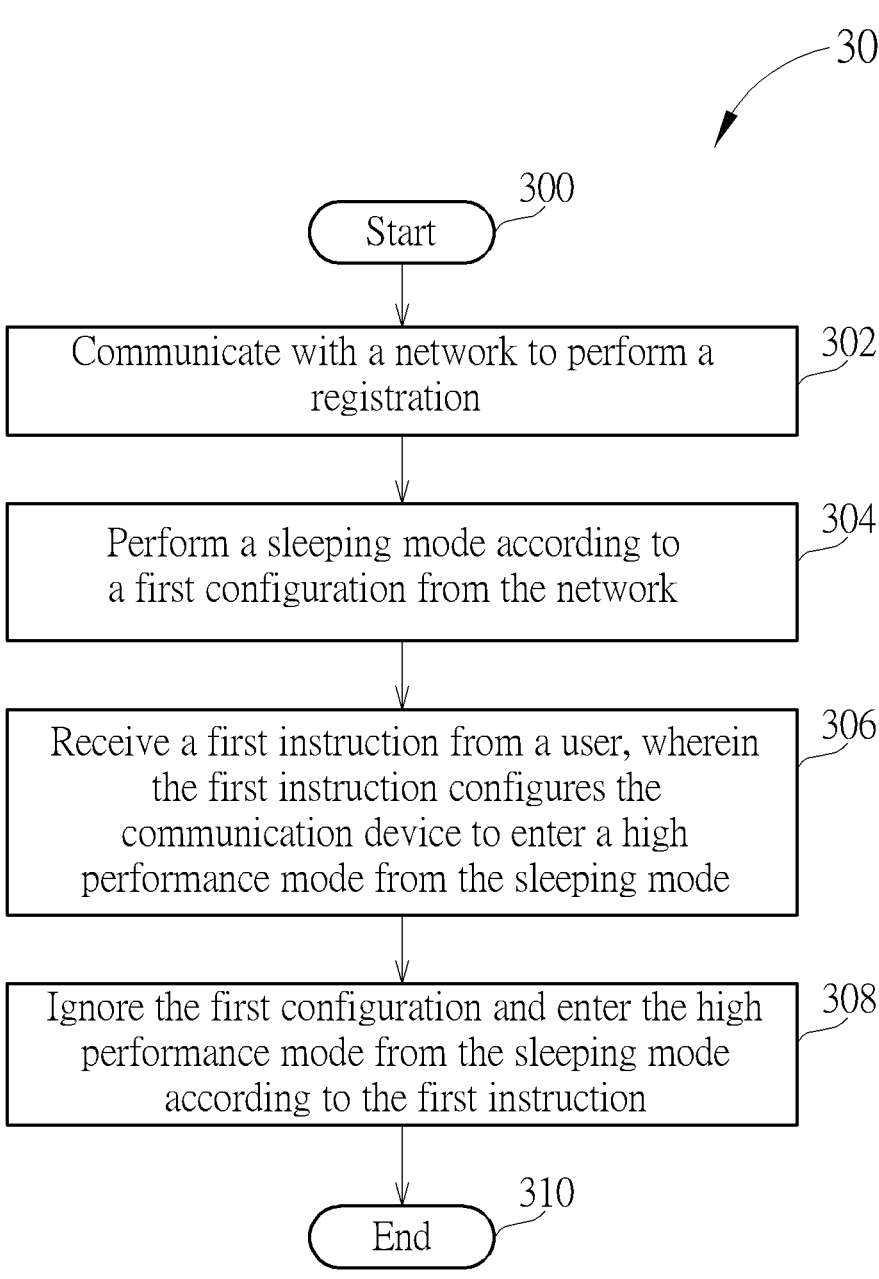
FIG. 3 is a flowchart of a process according to an example of the present invention.

Operations of the communication device 20 in the above examples can be summarized into a process 30 shown in FIG. 3, which includes the following steps:

Step 300: Start.

Step 302: Communicate with a network to perform a registration.

Step 304: Perform a sleeping mode according to a first configuration from the network.

Step 306: Receive a first instruction from a user, wherein the first instruction configures the communication device to enter a high performance mode from the sleeping mode.

Step 308: Ignore the first configuration and enter the high performance mode from the sleeping mode according to the first instruction.

Step 310: End.

The process 30 is used for illustrating the operations of the communication device 20. Detailed description and variations of the process 30 can be known by referring to the above description, and are not narrated herein.

The terms of "first" and "second" described above distinguish the related description, but do not limit the order of the related description. The term "according to" described above may be replaced by the term "via", "by using" or "in response to". The term "comprise" described above may be replaced by the term "is". The term "associated with" described above may be replaced by the term "corresponding to".

It should be noted that there are various possible realizations of the communication device 20 (including the transceiver circuit 200, the transmitting circuit 202, the receiving circuit 204 and the processing circuit 210). For example, the devices/circuits mentioned above may be integrated into one or more devices/circuits. In addition, the communication device 20 and the circuits in the communication device 20 may be realized by hardware (e.g., circuits), software, firmware (known as a combination of a hardware device, computer instructions and data that reside as read-only software on the hardware device), an electronic system or a combination of the devices mentioned above, but are not limited herein.

To sum up, the present invention provides a communication device and a method of handling a sleeping mode. Without affecting the network and other communication devices, when receiving the instruction for the communication device to enter the high performance mode, the communication device does not notify the network, ignores the configuration for the sleeping mode and enters the high performance mode. This may save time for reconnecting/synchronizing the communication device with the network after the communication device is out of the sleeping mode, and may avoid resource occupation caused by an additional communication between the communication device and the network.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device, comprising:

a transceiver circuit, for communicating with a network to perform a registration; and a processing circuit, coupled to the transceiver circuit, for:

performing a sleeping mode according to a first configuration from the network;

receiving a first instruction from a user, wherein the first instruction configures the communication device to enter a high performance mode from the sleeping mode;

ignoring the first configuration and entering the high performance mode from the sleeping mode according to the first instruction;

receiving a second instruction from the user, wherein the second instruction configures the communication device to enter the sleeping mode from the high performance mode;

reconfiguring the first configuration according to the second instruction to enter the sleeping mode from the high performance mode according to the first configuration;

performing a scan continuously to connect the network, when the communication device is not in a coverage of the network and the communication device is in the high performance mode; and performing the scan in at least one specific time interval to connect to the network, when the communication device is not in the coverage of the network and the communication device is in the sleeping mode;

wherein the transceiver circuit comprises:

a transmitting circuit, for transmitting an attach request message to the network; and a receiving circuit, for receiving an attach accept message for responding to the attach request message from the network;

wherein the attach request message comprises a second configuration for the sleeping mode that the communication device desires, and the attach accept message comprises the first configuration for the sleeping mode.

2. The communication device of claim 1, wherein the first configuration is determined according to the second configuration.

3. The communication device of claim 1, wherein the second configuration is the same as the first configuration.

4. The communication device of claim 1, wherein the sleeping mode comprises at least one of a power saving mode (PSM) and an extended idle mode discontinuous reception (eDRX) mode.

5. A method for handling a sleeping mode of a communication device, comprising:

communicating with a network to perform a registration;

transmitting an attach request message to the network;

receiving an attach accept message for responding to the attach request message from the network;

performing a sleeping mode according to a first configuration from the network;

receiving a first instruction from a user, wherein the first instruction configures the communication device to enter a high performance mode from the sleeping mode;

ignoring the first configuration and entering the high performance mode from the sleeping mode according to the first instruction;

receiving a second instruction from the user, wherein the second instruction configures the communication device to enter the sleeping mode from the high performance mode;

reconfiguring the first configuration according to the second instruction, to enter the sleeping mode from the high performance mode according to the first configuration;

performing a scan continuously to connect to the network, when the communication device is not in a coverage of the network and the communication device is in the high performance mode; and performing the scan in at least one specific time interval to connect the network, when the communication device is not in the coverage of the network and the communication device is in the sleeping mode;

wherein the attach request message comprises a second configuration for the sleeping mode that the communication device desires, and the attach accept message comprises the first configuration for the sleeping mode.

6. The method of claim 5, wherein the first configuration is determined according to the second configuration.

7. The method of claim 5, wherein the second configuration is the same as the first configuration.

8. The method of claim 5, wherein the sleeping mode comprises at least one of a power saving mode (PSM) and an extended idle mode discontinuous reception (eDRX) mode.

* * * * *